(12) United States Patent
Issa et al.

(10) Patent No.: US 9,098,868 B1
(45) Date of Patent: Aug. 4, 2015

(54) COORDINATING ADVERTISEMENTS AT MULTIPLE PLAYBACK DEVICES

(75) Inventors: Alfredo C. Issa, Apex, NC (US); Gregory Morgan Evans, Raleigh, NC (US); Richard J. Walsh, Raleigh, NC (US)

(73) Assignee: Qurio Holdings, Inc., Raleigh, NC (US)

(*) Notice: Subject to any disclaimer, the term of this patent is extended or adjusted under 35 U.S.C. 154(b) by 2585 days.

(21) Appl. No.: 11/688,404

(22) Filed: Mar. 20, 2007

(51) Int. Cl.
G06Q 30/02 (2012.01)

(52) U.S. Cl.
CPC .................... *G06Q 30/0272* (2013.01)

(58) Field of Classification Search
CPC .................................................. G06Q 30/0272
USPC ..................... 705/14.4, 14.45, 14.49
See application file for complete search history.

(56) References Cited

U.S. PATENT DOCUMENTS

| | | | |
|---|---|---|---|
| 4,775,935 A | 10/1988 | Yourick | |
| 5,155,591 A | 10/1992 | Wachob | |
| 5,231,494 A | 7/1993 | Wachob | |
| 5,534,911 A | 7/1996 | Levitan | |
| 5,543,842 A | 8/1996 | Xu et al. | |
| 5,557,721 A | 9/1996 | Fite et al. | |
| 5,740,549 A | 4/1998 | Reilly et al. | |
| 5,794,210 A | 8/1998 | Goldhaber et al. | |
| 5,855,008 A | 12/1998 | Goldhaber et al. | |
| 5,959,623 A | 9/1999 | van Hoff et al. | |
| 5,974,398 A | 10/1999 | Hanson et al. | |
| 6,025,837 A | 2/2000 | Matthews, III et al. | |
| 6,204,887 B1 | 3/2001 | Hiroi | |
| 6,219,837 B1 | 4/2001 | Yeo et al. | |

(Continued)

FOREIGN PATENT DOCUMENTS

| | | |
|---|---|---|
| EP | 0 989 722 A1 | 3/2000 |
| EP | 1162840 A2 | 6/2001 |

(Continued)

OTHER PUBLICATIONS

Thomas E. Truman et al., "The InfoPad Multimedia Terminal: A Portable Device for Wireless Information Access," (article), Oct. 1998, pp. 1073-1087, Transactions on Computers, vol. 47, Issue 10, Abstract only, http://csdl2.computer.org/persagen/DLAbsToc. jsp?resourcePath=/dl/trans/tc/&toc=comp/trans/tc/1998/10/txtoc. xml&DOI=10.1109/12.729791.

(Continued)

*Primary Examiner* — Naresh Vig
*Assistant Examiner* — Michael Goldman
(74) *Attorney, Agent, or Firm* — Withrow & Terranova, PLLC

(57) ABSTRACT

A system and method for coordinating advertisements on multiple playback devices during playback of heterogeneous content are provided. In general, a virtual group of playback devices or users of the playback devices is formed and managed by a virtual group (VG) control function. In operation, the VG control function operates to coordinate advertisement slots in heterogeneous content being played by the playback devices and provide targeted advertisements to the playback devices for insertion into the coordinated advertisement slots. The targeted advertisements may be, for example, targeted advertisements for each user or playback device, targeted advertisements for subsets of the users or playback devices in the virtual group, targeted advertisements for the virtual group, targeted complementary advertisements for subsets of users or playback devices in the virtual group, or targeted complementary advertisements for the virtual group.

28 Claims, 6 Drawing Sheets

(56) References Cited

U.S. PATENT DOCUMENTS

| | | |
|---|---|---|
| 6,240,555 B1 | 5/2001 | Shoff et al. |
| 6,324,519 B1 | 11/2001 | Eldering |
| 6,496,857 B1 | 12/2002 | Dustin et al. |
| 6,574,793 B1 | 6/2003 | Ngo et al. |
| 6,633,608 B1 | 10/2003 | Miller |
| 6,637,032 B1 | 10/2003 | Feinleib |
| 6,698,020 B1 | 2/2004 | Zigmond et al. |
| 6,727,958 B1 | 4/2004 | Shyu |
| 6,738,978 B1 | 5/2004 | Hendricks et al. |
| 6,769,130 B1 | 7/2004 | Getvin et al. |
| 6,799,326 B2 | 9/2004 | Boylan, III et al. |
| 6,820,277 B1 * | 11/2004 | Eldering et al. ............... 725/35 |
| 6,968,012 B1 | 11/2005 | Meggers |
| 6,973,436 B1 | 12/2005 | Shkedi |
| 7,039,932 B2 | 5/2006 | Eldering |
| 7,043,746 B2 | 5/2006 | Ma |
| 7,085,732 B2 | 8/2006 | Gould |
| 7,096,487 B1 | 8/2006 | Gordon et al. |
| 7,099,331 B2 * | 8/2006 | Taylor ..................... 370/395.41 |
| 7,100,183 B2 | 8/2006 | Kunkel et al. |
| 7,134,132 B1 | 11/2006 | Ngo et al. |
| 7,136,871 B2 | 11/2006 | Ozer et al. |
| 7,146,627 B1 | 12/2006 | Ismail et al. |
| 7,155,210 B2 | 12/2006 | Benson |
| 7,158,959 B1 | 1/2007 | Chickering et al. |
| 7,185,353 B2 | 2/2007 | Schlack |
| 7,209,874 B2 | 4/2007 | Salmonsen |
| 7,228,555 B2 * | 6/2007 | Schlack ........................ 725/35 |
| 7,386,512 B1 * | 6/2008 | Allibhoy et al. ................ 705/51 |
| 7,565,450 B2 | 7/2009 | Garcia-Luna-Aceves et al. |
| 7,600,037 B2 | 10/2009 | Tucker |
| 7,650,617 B2 | 1/2010 | Hoshino et al. |
| 7,652,594 B2 * | 1/2010 | Lamont et al. ................ 340/988 |
| 7,805,373 B1 * | 9/2010 | Issa et al. ........................ 705/51 |
| 8,315,906 B2 | 11/2012 | Steelberg et al. |
| 2002/0013757 A1 | 1/2002 | Bykowsky et al. |
| 2002/0042782 A1 | 4/2002 | Albazz et al. |
| 2002/0072966 A1 | 6/2002 | Eldering et al. |
| 2002/0083439 A1 | 6/2002 | Eldering |
| 2002/0087402 A1 | 7/2002 | Zustak et al. |
| 2002/0095454 A1 | 7/2002 | Reed et al. |
| 2002/0099606 A1 | 7/2002 | Shlagman |
| 2002/0129368 A1 | 9/2002 | Schlack et al. |
| 2002/0138291 A1 | 9/2002 | Vaidyanathan et al. |
| 2002/0138440 A1 | 9/2002 | Vaidyanathan et al. |
| 2002/0138831 A1 | 9/2002 | Wachtfogel et al. |
| 2002/0178445 A1 | 11/2002 | Eldering et al. |
| 2002/0184047 A1 * | 12/2002 | Plotnick et al. ................ 705/1 |
| 2002/0184403 A1 | 12/2002 | Dahlia et al. |
| 2003/0004793 A1 | 1/2003 | Feuer et al. |
| 2003/0008613 A1 | 1/2003 | Karr et al. |
| 2003/0093790 A1 | 5/2003 | Logan et al. |
| 2003/0114146 A1 | 6/2003 | Benson |
| 2003/0115597 A1 | 6/2003 | Yassin et al. |
| 2003/0149975 A1 | 8/2003 | Eldering et al. |
| 2003/0154475 A1 | 8/2003 | Rodriguez et al. |
| 2003/0196211 A1 | 10/2003 | Chan |
| 2003/0226147 A1 | 12/2003 | Richmond et al. |
| 2003/0231854 A1 | 12/2003 | Derrenberger |
| 2004/0003398 A1 | 1/2004 | Donian et al. |
| 2004/0111742 A1 | 6/2004 | Hendricks et al. |
| 2004/0128317 A1 | 7/2004 | Sull et al. |
| 2004/0133512 A1 | 7/2004 | Woolston |
| 2004/0139025 A1 | 7/2004 | Coleman |
| 2004/0148625 A1 | 7/2004 | Eldering et al. |
| 2004/0210896 A1 | 10/2004 | Chou et al. |
| 2004/0213542 A1 | 10/2004 | Hamasaka et al. |
| 2004/0215568 A1 | 10/2004 | Fukushima et al. |
| 2004/0248601 A1 | 12/2004 | Chang |
| 2005/0039205 A1 | 2/2005 | Riedl |
| 2005/0084009 A1 | 4/2005 | Furukawa et al. |
| 2005/0091160 A1 | 4/2005 | Kitze et al. |
| 2005/0097183 A1 | 5/2005 | Westrelin |
| 2005/0097599 A1 | 5/2005 | Plotnick et al. |
| 2005/0108776 A1 | 5/2005 | Carver et al. |
| 2005/0114885 A1 | 5/2005 | Shikata et al. |
| 2005/0137958 A1 | 6/2005 | Huber et al. |
| 2005/0152394 A1 | 7/2005 | Cho |
| 2005/0193425 A1 | 9/2005 | Sull et al. |
| 2005/0204387 A1 | 9/2005 | Knudson et al. |
| 2005/0283796 A1 | 12/2005 | Flickinger |
| 2006/0036490 A1 | 2/2006 | Sagalyn |
| 2006/0075057 A1 | 4/2006 | Gildea et al. |
| 2006/0085254 A1 | 4/2006 | Grim, III et al. |
| 2006/0095507 A1 | 5/2006 | Watson |
| 2006/0107302 A1 | 5/2006 | Zdepski |
| 2006/0110552 A1 | 5/2006 | Ishida et al. |
| 2006/0168616 A1 | 7/2006 | Candelore |
| 2006/0174312 A1 | 8/2006 | Ducheneaut et al. |
| 2006/0174313 A1 | 8/2006 | Ducheneaut et al. |
| 2006/0212900 A1 | 9/2006 | Ismail et al. |
| 2006/0253323 A1 | 11/2006 | Phan et al. |
| 2006/0270395 A1 | 11/2006 | Dhawan et al. |
| 2006/0294555 A1 | 12/2006 | Xie |
| 2007/0003223 A1 | 1/2007 | Armstrong et al. |
| 2007/0011050 A1 | 1/2007 | Klopf et al. |
| 2007/0011702 A1 | 1/2007 | Vaysman |
| 2007/0015531 A1 | 1/2007 | Disalvo |
| 2007/0027754 A1 | 2/2007 | Collins et al. |
| 2007/0038514 A1 | 2/2007 | Patterson et al. |
| 2007/0100690 A1 | 5/2007 | Hopkins |
| 2007/0150537 A1 | 6/2007 | Graham |
| 2007/0192789 A1 | 8/2007 | Medford |
| 2007/0198660 A1 | 8/2007 | Cohen |
| 2007/0204115 A1 | 8/2007 | Abramson |
| 2007/0244750 A1 | 10/2007 | Grannan et al. |
| 2008/0005347 A1 | 1/2008 | Ott |
| 2008/0080568 A1 | 4/2008 | Hughes et al. |
| 2008/0186972 A1 | 8/2008 | Guo |
| 2013/0117621 A1 | 5/2013 | Saraiya et al. |

FOREIGN PATENT DOCUMENTS

| | | |
|---|---|---|
| EP | 1 162 840 A2 | 12/2001 |
| EP | 1 524 602 A2 | 4/2005 |
| EP | 1 528 478 A1 | 5/2005 |
| WO | WO 98/31149 A1 | 7/1998 |
| WO | WO 99/05584 A2 | 2/1999 |
| WO | WO 99/52285 A1 | 10/1999 |
| WO | 00/64165 A1 | 10/2000 |
| WO | WO 01/71524 A1 | 9/2001 |
| WO | 0213112 A1 | 2/2002 |
| WO | WO 02/19581 A1 | 3/2002 |
| WO | WO 02/45430 A2 | 6/2002 |
| WO | 2004/003879 A2 | 1/2004 |
| WO | 2004/049226 A1 | 6/2004 |
| WO | WO 2005/051020 A1 | 6/2005 |
| WO | 2005/065190 A2 | 7/2005 |

OTHER PUBLICATIONS

Robert Brodersen, "InfoPad an Experiment in System Level Design and Integration," (article), 1997, 2 pages, Dept. of EECS University of California, Berkeley, Proceedings of the 34th Annual Conference on Design Automation.

James Gwertzman et al., "An Analysis of Geographical Push-Caching," (article), May 1995, pp. 51-55, in Proceedings of the 5th IEEE Workshop on Hot Topics in Operating Systems, Orcas Island, WA.

No Author, "Internet Cache Protocol—Wikipedia," (website), obtained Jun. 15, 2007, 2 pages, http://en.wikipedia.org/wiki/Internet_Cache_Protocol.

R. Recio et al., "A Remote Direct Memory Access Protocol Specification," (article), Sep. 8, 2006, 82 pages, Internet Draft, http://www.ietf.org/internet-drafts/draft-ietf-rddp-rdmap-07.txt.

No Author, "SnapStream:PC DVR and TV tuner software," (website), obtained Jun. 15, 2007, 1 page, http://www.snapstream.com.

No Author, "Squid Cache—Wikipedia," (website), obtained Jun. 15, 2007, 3 pages, http://en.wikipedia.org/wiki/Squid_cache.

No Author, "Advertisement Bidding System and Method," (article), date unknown, 20 pages, http://www.priorartdatabase.com/IPCOM/000138556.

(56) References Cited

OTHER PUBLICATIONS

Feng et al., ""When DRM Meets Restricted Multicast: A Content Encryption Key Scheme for Multicast Encryption andU DRM."" Consumer Communications and Networking Conference, 2007. CCNC 2007. 4th IEEE Digital Object Identifier:10.1109/CCNC. 2007.211, Jan. 2007 , pp. 1048-1052.

Margounakis, D., et al., "SEAM: A Sound-Embedded Advertisement Model for Online Digital Music Distribution Automated Production of Cross Media Content for Multi-Channel Distribution", 2006. AXMEDIS '06. Second International Conference on Digital Object Identifier: 10.1109/AXMEDIS.2006.43 Publication Year: 2006 pp. 273-282.

* cited by examiner

COORDINATING ADVERTISEMENTS AT MULTIPLE PLAYBACK DEVICES

FIELD OF THE INVENTION

The present invention relates to coordinating advertisements to a number of associated playback devices during playback of heterogeneous content.

BACKGROUND OF THE INVENTION

There is an increasing trend to view video content on devices other than a television such a personal computer, an Apple iPod®, a Microsoft Zune™, a mobile phone, a Personal Digital Assistant (PDA), or the like. Unlike a television, these devices primarily have a one-to-one mapping with a user. As such, a first user may be watching video content on his device while a second user that is proximate to or otherwise associated with the first user may be watching different content on her device. For example, consider three users A, B, and C that are in close physical proximity such as in a living room of their home. User A is viewing previously downloaded or Video-on-Demand (VOD) content on a wireless handheld device, such as a Microsoft Zune™, Nintendo DS®, or other WiFi-capable playback handheld video device. User B is watching content on a High Definition Television (HDTV) device provided by an associated set-top box that functions as a Digital Video Recorder (DVR) and a digital signal decoder. User C is watching a downloaded video from a service such as Apple iTunes® on a personal computer. Alternatively, all three users may be viewing content provided by a single provider, such as a cable television provider, but may be still watching different, or heterogeneous, content. In such a system, it is desirable to coordinate targeted advertisements at multiple playback devices during playback of heterogeneous content.

SUMMARY OF THE INVENTION

The present invention relates to coordinating advertisements on multiple playback devices during playback of heterogeneous content. In general, a virtual group of playback devices or users of the playback devices is formed and managed by a virtual group (VG) control function. In one embodiment, the VG control function is hosted by a central node communicatively coupled to the playback devices via a Personal Area Network (PAN), Local Area Network (LAN), Wide Area Network (WAN), or the like or any combination thereof. In operation, the VG control function operates to coordinate advertisement slots in heterogeneous content being played by the playback devices and provide targeted advertisements to the playback devices for insertion into the coordinated advertisement slots. The targeted advertisements may be, for example, targeted advertisements for each user or playback device, targeted advertisements for subsets of the users or playback devices in the virtual group, targeted advertisements for the virtual group, targeted complementary advertisements for subsets of users or playback devices in the virtual group, or targeted complementary advertisements for the virtual group.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 3 illustrates ad slots in heterogeneous content being played by the playback devices;

FIG. 4 illustrates a scheme of coordinating the ad slots in the heterogeneous content of FIG. 3 by adjusting playback timing according to one embodiment of the present invention;

FIG. 5 illustrates a scheme of coordinating ad slots in the heterogeneous content of FIG. 3 by inserting coordinated artificial ad slots in the heterogeneous content in place of the natural ad slots according to one embodiment of the present invention;

FIGS. 6 and 7 illustrate a scheme of coordinating ad slots in heterogeneous content played by the playback devices by extending the natural ad slots in the content according to one embodiment of the present invention;

FIGS. 8 and 9 illustrate staggering of ad slots as a manner of coordinating ad slots according to one embodiment of the present invention;

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to coordinating advertisements on multiple playback devices during playback of heterogeneous content. In general, a virtual group of playback devices or users of the playback devices is formed and managed by a virtual group (VG) control function. In operation, the VG control function operates to coordinate advertisement slots in heterogeneous content being played by the playback devices and provide targeted advertisements to the playback devices for insertion into the coordinated advertisement slots. The targeted advertisements may be, for example, targeted advertisements for each user or playback device, targeted advertisements for subsets of the users or playback devices in the virtual group, targeted advertisements for the virtual group, targeted complementary advertisements for subsets of users or playback devices in the virtual group, or targeted complementary advertisements for the virtual group.

Figure 1:
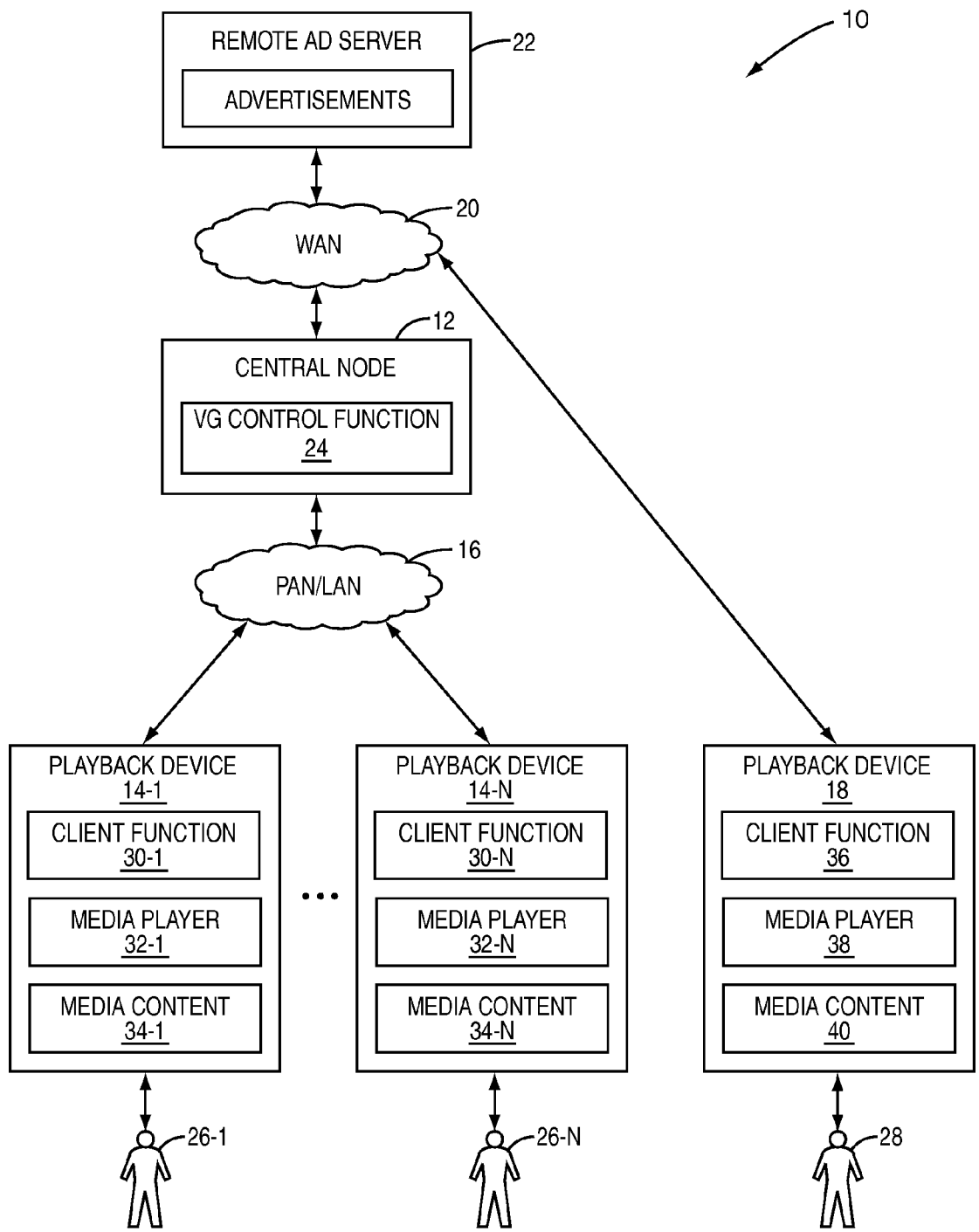
FIG. 1 illustrates a system for coordinating advertisements at multiple playback devices playing heterogeneous content according to one embodiment of the present invention.

FIG. 1 illustrates a system 10 according to one embodiment of the present invention. In general, the system 10 includes a central node 12 communicatively coupled to playback devices 14-1 through 14-N via a network 16, which may be a Personal Area Network (PAN) or Local Area Network (LAN), and, optionally, a playback device 18 via a Wide Area Network (WAN) 20. Note that the central node 12 may alternatively be connected to the playback device 18 via a separate PAN or LAN. The central node 12 is also communicatively coupled to a remote advertisement, or "ad," server 22 via the WAN 20. As used herein, a PAN may be formed by devices having a wired connection such as a Universal Serial Bus (USB) connection, a local wireless connection such as a Bluetooth or IEEE 802.11 connection, or the like; a LAN may be, for example, an Ethernet network, a Wireless Fidelity (WiFi) network, or the like; and a WAN may be any type or combination of WANs such as, for example, the Internet.

According to one embodiment of the present invention, a Virtual Group (VG) control function 24 is hosted by the central node 12 and the playback devices 14-1 through 14-N and 18 or their associated users 26-1 through 26-N and 28 are either statically or dynamically associated to form a virtual group. For this description, the virtual group is referred to as a virtual group of playback devices. The virtual group may be formed on the user level or the playback device level. In this embodiment, the playback devices 14-1 through 14-N are proximate to one another. For example, the playback devices 14-1 through 14-N may be located or carried by users within a room, a house, a building, or the like. In contrast, the playback device 18 is at a remote location. However, the present invention is not limited thereto. For example, all of the playback devices 14-1 through 14-N and 18 may be remote from one another and connected to the central node 12 via the WAN 20.

In one embodiment, the users 26-1 through 26-N and 28 are having a shared experience. The users 26-1 through 26-N are having a shared experience as a result of their close physical proximity to one another. In addition, the user 28 may interact with one or more of the users 26-1 through 26-N via, for example, Instant Messaging (IM), phone, Voice-over-IP (VoIP), or the like such that the user 28 has a shared experience with the users 26-1 through 26-N.

The VG control function 24 may be implemented in software, hardware, or a combination of software and hardware. As discussed below in detail, the VG control function 24 generally operates to form the virtual group of playback devices 14-1 through 14-N and 18. The VG control function 24 then coordinates advertisement slots in heterogeneous content being played by the playback devices 14-1 through 14-N and 18 in the virtual group, obtains targeted advertisements from the remote ad server 22, and provides the targeted advertisements to the playback devices 14-1 through 14-N and 18 for insertion into the coordinated advertisement slots in the heterogeneous content during playback.

As used herein, "heterogeneous content" refers to different content being played by the playback devices 14-1 through 14-N and 18. In one embodiment, the heterogeneous content is heterogeneous video content such that different video content is being played or viewed at the playback devices 14-1 through 14-N and 18. For example, each of the playback devices 14-1 through 14-N and 18 may be playing a different video, movie, television program, or the like. This is to include the situation where two or more of the playback devices 14-1 through 14-N are playing the same video content but are at different points during playback of the video content. For example, the playback device 14-1 may be at the beginning of playback of a movie and the playback device 18 may be at some intermediate point during playback of the same movie. As such, for purposes of this description, the two playback devices 14-1 and 18 are playing heterogeneous content.

While the discussion herein focuses on heterogeneous video content, the present invention is not limited thereto. The present invention is equally applicable to, for example, coordinating advertisements in heterogeneous audio content such as songs, radio broadcasts, or the like. Still further, the present invention is also applicable to coordinating advertisements in heterogeneous video and audio content. For example, one or more of the playback devices 14-1 through 14-N and 18 may be playing video content while others are playing audio content.

The playback device 14-1 may be, for example, a personal computer; a mobile device such as a Personal Digital Assistant (PDA), mobile telephone, Portable Media Player (PMP) such as a Microsoft Zune™, Nintendo® DS, or Sony PSP®, or the like; a set-top box; a set-top box function hosted by or incorporated into a computing device; a Digital Video Recorder (DVR) such as a TiVo® DVR; or any other type of presentation device having media playback or presentation capabilities and an interface to the network 16. The playback device 14-1 includes a client function 30-1, a media player 32-1, and media content 34-1. The client function 30-1 and the media player 32-1 may each be implemented in software, hardware, or a combination of software and hardware. The media content 34-1 is a database or collection of media content items such as movies, television programs, video clips, or the like stored by the playback device 14-1. The media player 32-1 operates to play the media content 34-1 as desired by the user 26-1 or, alternatively, play media content provided to the playback device 14-1 from a service such as, for example, a cable television service, a satellite television service, an Internet Protocol Television (IPTV) service, or the like. The client function 30-1 interacts with the VG control function 24 and the media player 32-1 to coordinate ad slots with the other playback devices 14-2 through 14-N and 18 during playback of media content and to insert targeted advertisements into the coordinated ad slots. Note that, as used herein, an "ad slot" is a defined break in content having a length defined by an advertisement inserted into the ad slot or a defined break having a defined length such as, for example, 30 seconds. In addition or alternatively, an ad slot may be a defined period during content wherein a visual, audio, or audio-visual advertisement may be overlaid or superimposed upon the content.

Similarly, the playback device 14-N may be, for example, a personal computer; a mobile device such as a PDA, mobile telephone, PMP such as a Microsoft Zune™, Nintendo® DS, or Sony PSP®, or the like; a set-top box; a set-top box function hosted by or incorporated into a computing device; a DVR such as a TiVo® DVR; or any other type of presentation device having media playback or presentation capabilities and an interface to the network 16. The playback device 14-N includes a client function 30-N, a media player 32-N, and media content 34-N. Likewise, the playback device 18 may be, for example, a personal computer; a mobile device such as a PDA, mobile telephone, PMP, or the like; a set-top box; a set-top box function hosted by or incorporated into a computing device; or the like having media playback capabilities and an interface to the network 20. The playback device 18 includes a client function 36, a media player 38, and media content 40.

Note that, as will be apparent to one of ordinary skill in the art upon reading this description, numerous variations of the illustrated embodiment of the system 10 are possible and are to be considered within the scope of the present invention. For example, the VG control function 24 may alternatively be hosted by a remote server such as, for example, the remote ad server 22 where the playback devices 14-1 through 14-N may then be connected to the remote ad server 22 via the WAN 20. Further, while the VG control function 24 is illustrated as being hosted by the control node 12, the VG control function 24 may alternatively be hosted by one of the playback devices 14-1 through 14-N and 18 or distributed among two or more of the playback devices 14-1 through 14-N and 18.

Figure 2:
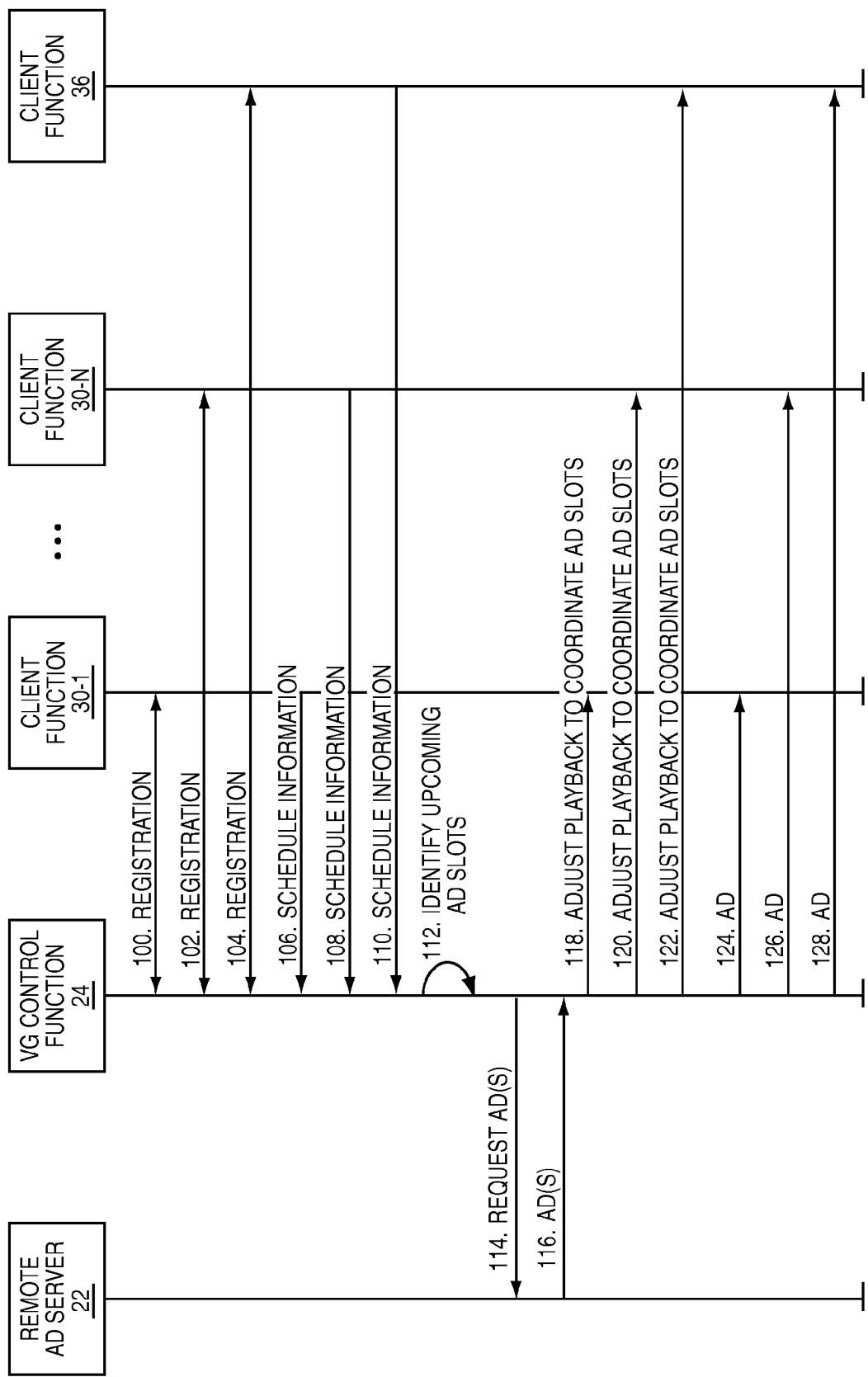
FIG. 2 illustrates the operation of the system of FIG. 1 according to one embodiment of the present invention.

FIG. 2 illustrates the operation of the system 10 of FIG. 1 according to one embodiment of the present invention. Initially, the virtual group is formed via, for example, a registration process (steps 100-104). In one embodiment, registration is a static registration process wherein the members of the virtual group are static and defined by, for example, a group owner or an operator of the system 10. Once the playback devices 14-1 through 14-N and 18 are registered with the virtual group, they are permanent members of the virtual group until they are manually removed. Note, however, that the playback devices 14-1 through 14-N and 18 are active members of the virtual group only when they are connected to the networks 16 and 20, respectively.

In another embodiment, registration is a dynamic process wherein the playback devices 14-1 through 14-N and 18 discover the VG control function 24 using, for example, WiFi or other network discovery schemes, a look-up service, or the like. Once the VG control function 24 is discovered, the playback devices 14-1 through 14-N and 18 join the virtual group. Note that, in one embodiment, the VG control function 24 hosts more than one virtual group. As such, the VG control function 24 may automatically add the playback devices 14-1 through 14-N and 18 to the virtual group based on user preferences, viewing habits, or the like. Alternatively, the VG control function 24 may recommend the virtual group to the playback devices 14-1 through 14-N and 18, wherein the users 26-1 through 26-N and 28 then authorize registration with the virtual group, if desired.

Once registration is complete, the client functions 30-1 through 30-N and 36, which may have been downloaded and installed either before, during, or after the registration process, provide schedule information to the VG control function 24 (steps 106-110). The schedule information includes metadata or information describing the content being played such as, for example, a title of the content, a genre of the content, content type, rating (G, PG, PG-13, R, etc.); a length or duration of the content; chapter information or break points during the content defining what is referred to herein as "natural" ad slots or breaks; chapter or segment metadata describing or annotating each chapter or segment of the content; timing information such as a current position in playback of the content; and playback events such as playback start, stop, fast-forward, and rewind events.

In an alternative embodiment, rather than including the metadata describing the content, length or duration of the content, chapter information or break points, and/or chapter or segment metadata, the schedule information may include information identifying the content such as, for example, an identifier (ID) of the content. The VG control function 24 may then obtain the metadata describing the content, length or duration of the content, chapter information or break points, and/or chapter or segment metadata from a remote source or database associated with the central node 12. For example, if the central node 12 is a set-top box or other device associated with a cable television distribution system, the central node 12 may store or have access to an Electronic Programming Guide (EPG). As such, the ID of the content, which may be a channel and time of day at which the content was broadcast, may be used by the VG control function 24 to obtain information regarding the content from the EPG. As another example, the VG control function 24 may query a remote database for the desired information using the content ID.

Once the schedule information is received, the VG control function 24 identifies the natural ad slots, or at least the upcoming natural ad slots, in the content being played by the playback devices 14-1 through 14-N and 18 (step 112). The VG control function 24 requests one or more targeted advertisements from the remote ad server 22 based on the schedule information and optionally user preferences of the users 26-1 through 26-N and 28 entered during registration or derived from an analysis of playback histories of the users 26-1 through 26-1 and 28 and/or user profiles of the users 26-1 through 26-N and 28 (step 114). The user profiles may include, for example, demographic information describing the users 26-1 through 26-N and 28 such as, for example, gender, race, income level, or the like; biographical information describing the users 26-1 through 26-N and 28 such as, for example, name, address, date of birth or age, city or state of birth; and/or information identifying relationships between the users 26-1 through 26-N and 28 such as husband/wife, parent/child, boyfriend/girlfriend, or the like.

In one embodiment, the request may include the information describing the content being played by the playback devices 14-1 through 14-N and 18, the information describing the chapters or segments being played by the playback devices 14-1 through 14-N and 18, information derived from an analysis of the information describing the content being played by the playback devices 14-1 through 14-N and 18, information derived from an analysis of the information describing the chapters or segments being played by the playback devices 14-1 through 14-N and 18, the user preferences of the users 26-1 through 26-N and 28, the user profiles of the users 26-1 through 26-N and 28, or any combination thereof. In response, the remote ad server 22 may identify one or more advertisements for the members of the virtual group based on a comparison of the information in the request and metadata or information describing the advertisements hosted by the remote ad server 22. The metadata describing an advertisement may include, for example, advertisement type (video, audio, etc.), genre, rating, desired demographic group, desired biographical group, media content during which presentation of the advertisement is desired, and the like.

Alternatively, the VG control function 24 may store a database including the metadata describing the advertisements hosted by the remote ad server 22. The VG control function 24 may therefore identify one or more advertisements for the members of the virtual group based on a comparison of the schedule information, user preferences, and/or user profiles and the metadata or information describing the advertisements hosted by the remote ad server 22. The VG control function 24 may then request the one or more advertisements identified or selected for the virtual group from the remote ad server 22.

Whether the one or more advertisements for the virtual group are selected by the remote ad server 22 or the VG control function 24, the advertisements may be selected according to, for example, one or more of the following schemes. In a first advertisement selection scheme, a targeted advertisement is selected for each of the playback devices 14-1 through 14-N and 18. Using the playback device 14-1 as an example, the target advertisement may be selected based on a comparison of the metadata describing the advertisements hosted by the remote ad server 22 and the schedule information from the playback device 14-1, the user preferences of the user, and/or the user profile of the user 26-1. Any type of selection scheme for selecting an advertisement based on metadata may be used. The advertisements for the other playback devices 14-2 through 14-N and 18 may be selected in a similar fashion.

In a second advertisement selection scheme, a targeted advertisement is selected for the entire virtual group. The target advertisement may be selected based on a comparison of the metadata describing the advertisements hosted by the remote ad server 22 and the schedule information from the playback devices 14-1 through 14-N and 18, the user preferences of the users 26-1 through 26-N and 28, and/or the user profiles of the users 26-1 through 26-N and 28. Again, any type of selection scheme for selecting an advertisement based on metadata may be used.

In a third advertisement selection scheme, a targeted advertisement is selected for sub-groups within the virtual group, where the sub-groups are related by, for example, demographic information such as income level, biological information such as age, user preferences, or the like. For each sub-group, the target advertisement may be selected based on a comparison of the metadata describing the advertisements hosted by the remote ad server 22 and the schedule information from ones of the playback devices 14-1 through 14-N and 18 in the sub-group, the user preferences of ones the users 26-1 through 26-N and 28 in the sub-group, and/or the user profiles of the ones of the users 26-1 through 26-N and 28 in the sub-group. Again, any type of selection scheme for selecting an advertisement based on metadata may be used.

In a fourth advertisement selection scheme, complementary advertisements from a particular advertiser or a number of related or associated advertisers are selected for the virtual group. For example, a Ford Mustang advertisement, a Ford Explorer advertisement, and a Ford Crown Victoria advertisement may be selected as complementary advertisements where the Ford Mustang advertisement is selected for ones of the users 26-1 through 26-N and 28 that are 20-30 years old, the Ford Explorer advertisement is selected for ones of the users 26-1 through 26-N and 28 that are 40-50 years old, and the Ford Crown Victoria advertisement is selected for ones of the users 26-1 through 26-N and 28 that are 60 years old or older. Note that the ages of the users 26-1 through 26-N and 28 may be included in their user profiles. Likewise, the target age groups for the advertisements may be included in the metadata for the advertisements.

In a fifth advertisement selection scheme, complementary advertisements are selected based on relationships between the users 26-1 through 26-N and 28 in the virtual group. Information identifying the relationships may be included in the user profiles of the users 26-1 through 26-N and 28. For example, if the users 26-1 and 26-N are husband and wife, advertisements may be selected for those users 26-1 and 26-N that take advantage that relationship. So, if it is near Valentine's Day, an advertisement for a jewelry store may be selected for the husband and an advertisement for an electronics store may be selected for the wife. Note that while the various advertisement selection schemes are discussed separately above, the remote ad server 22 or the VG control function 24 may use any number of these advertisement selection schemes to select targeted advertisements for the virtual group.

Once the one or more advertisements for the virtual group are identified and optionally requested from the remote ad server 22 depending on the particular embodiment, the remote ad server 22 transfers the one or more advertisements to the VG control function 24 at the central node 12 (step 116). Alternatively, if the playback devices 14-1 through 14-N and 18 are capable of connecting to the remote ad server 22 via the WAN 20, the VG control function 24 may provide information to the remote ad server 22 enabling transfer of the advertisements from the remote ad server 22 to the playback devices 14-1 through 14-N and 28, thereby bypassing the central node 12.

In this embodiment, the VG control function 24 then interacts with the client functions 30-1 through 30-N and 36 to adjust playback of the content at the playback devices 14-1 through 14-N and 18 to coordinate ad slots (steps 118-122). As discussed below in more detail, the VG control function 24 may coordinate the ad slots during playback at the playback devices 14-1 through 14-N and 18 by, for example, adjusting playback timing, inserting artificial ad slots into the content, extending the natural ad slots, or the like.

More specifically, the VG control function 24 may interact with the client functions 30-1 through 30-N and 36 to adjust the timing of the playback of the content at the playback devices 14-1 through 14-N and 18 such that natural ad slots in the content played by the playback devices 14-1 through 14-N and 18 are coordinated or synchronized. As used herein, coordinated ad slots may be, for example, synchronized ad slots, staggered ad slots, or the like. For example, the VG control function 24 may interact with the client function 30-1 to speed up playback or slow down playback at the playback device 14-1 such that a natural ad slot in the content being played occurs at a desired time in association with the natural or adjusted ad slots at the other playback devices 14-2 through 14-N and 18.

The VG control function 24 may also coordinate ad slots by interacting with the client functions 30-1 through 30-N and 36 to create artificial ad slots into the content being played where the artificial ad slots are coordinated. The natural ad slots may be ignored or skipped over.

As a last example, the VG control function 24 may interact with the client functions 30-1 through 30-N and 36 to coordinate the ad slots at the playback devices 14-1 through 14-N and 18 by extending the natural ad slots such that the ad slots, or extended ad slots, are coordinated. This may be desirable where there is a small time difference between the natural ad slot and the desired ad slot. The three schemes for coordinating the ad slots discussed above are exemplary and are not intended to limit the scope of the present invention. Further, while discussed separately, any combination of these schemes may be used to coordinate the ad slots within the virtual group.

Regardless of the scheme used to coordinate the ad slots at the playback devices 14-1 through 14-N and 18, the VG control function 24 also controls the time at which the coordinated ad slots occur. Exemplary schemes that may be used to control the time at which the coordinated ad slots occur are a super user scheme, a real-time programming filter scheme, a voting scheme, and an ad optimization scheme. Using the super user scheme, one of the users 26-1 through 26-N and 28 is identified as a "super user." The super user may be, for example, an owner or creator of the virtual group. For this example, assume that the user 26-1 is the super user. Once the super user is identified, the VG control function 24 may coordinate the ad slots at the other playback devices 14-2 through 14-N and 18 of the other users 26-2 through 26-N and 28 with the natural ad slots in the content played by the playback device 14-1 of the user 26-1. Alternatively, the super user, which is user 26-1, may define or otherwise indicate when ad slots are to occur at the playback device 14-1. The VG control function 24 may then coordinate the ad slots at the other playback devices 14-2 through 14-N and 18 with the ad slots defined by the user 26-1.

Using the real-time programming filter, the VG control function 24 identifies one or more of the playback devices 14-1 through 14-N and 18 in the virtual group that are playing real-time programming such as broadcast television content. If, for example, the playback device 14-1 is playing real-time programming, the VG control function 24 coordinates the ad slots at the other playback devices 14-2 through 14-N and 18 with the natural ad slots in the real-time programming playing at the playback device 14-1. If more than one of the playback devices 14-1 through 14-N and 18 are playing real-time programming, the VG control function 24 may coordinate ad slots of zero or more of the remaining playback devices with each of the playback devices playing real-time programming. For example, all of the remaining playback devices may be coordinated with one of the playback devices playing real-time programming or a subset of the remaining playback devices may be coordinated with each of the playback devices playing real-time programming.

Using the voting scheme, the users 26-1 through 26-N and 28 vote on when the synchronized ad slots are to occur or vote on when a key ad slot of the coordinated ad slots is to occur. The key ad slot is the ad slot to which the other slots are coordinated. The votes of the users 26-1 through 26-N and 28 may be assigned equal weights. Alternatively, the votes of the users 26-1 through 26-N and 28 may be assigned different weights based on, for example, relative priorities assigned to the users 26-1 through 26-N and 28 by the system 10, by an owner or creator of the virtual group, or the like.

Lastly, using the ad optimization scheme, the coordination of the ad slots may be optimized for the particular advertisements to be inserted into the ad slots. For example, the advertiser of a particular advertisement may desire or require that the advertisement be played at a particular point during playback of content or played during or at a particular point during playback of specific content. More specifically, the advertiser may desire or require that the advertisement be played in the last 25% of playback (for example, during the last 30 minutes of a 2-hour movie) when the content is most likely to be holding the user's attention or during a particular 5 minute segment of a particular movie when the advertisement will be particularly effective. As another example, an advertiser may desire that a particular advertisement or group of complementary advertisements be staggered, rather than synchronized, across the playback devices 14-1 through 14-N and 18 or a subset of the playback devices 14-1 through 14-N and 18.

Once the VG control function 24 has interacted with the client functions 30-1 through 30-N and 36 to coordinate the ad slots at the playback devices 14-1 through 14-N and 18, the VG control function 24 transfers one of the one or more advertisements obtained from the remote ad server 22 that is to be inserted into the ad slot at the playback device 14-1 to the client function 30-1 (step 124). Likewise, one of the advertisements is transferred to the client functions 30-2 through 30-N and 36 of the other playback devices 14-2 through 14-N and 18 (steps 126-128). As discussed above, depending on the advertisement selection scheme, the same advertisement may be transferred to each of the client functions 30-1 through 30-N and 36, a different advertisement may be transferred to each of the client functions 30-1 through 30-N and 36, or a different advertisement may be transferred to each of a number of subgroups of the client functions 30-1 through 30-N and 36. Note that unicast communication channels may be used for the transfers. In addition or alternatively, one or more multicast communication channels may be used to transfer a common advertisement to more than one of the client functions 30-1 through 30-N and 36. For example, a multicast communication channel may be desirable when each of the playback devices 14-1 though 14-N and 18 are to receive the same advertisement. Note that other schemes for transferring advertisements to the playback devices 14-1 through 14-N and 18 may be used, as will be apparent to one of ordinary skill in the art upon reading this disclosure. For example, advertisements may be downloaded to, for example, the playback device 14-1. The playback device 14-1 may then transfer the advertisements to the other playback devices 14-2 through 14-N and 18 as needed. As another example, the playback devices 14-1 through 14-N and 18 may download the advertisements in a collaborative fashion.

At this point, the process is repeated such that upcoming ad slots are coordinated and advertisements for the coordinated ad slots are selected and transferred to the playback devices 14-1 through 14-N and 18 for insertion into the heterogeneous content played by the playback devices 14-1 through 14-N and 18.

Note that the ordering of the steps illustrated in FIG. 2 is exemplary and is not intended to limit the scope of the present invention. For example, the ad slots may be coordinated before requesting the one or more advertisements from the remote ad server 22 or after transferring the advertisements to the client functions 30-1 through 30-N and 36 of the playback devices 14-1 through 14-N and 18.

Figures 3, 4, 5:
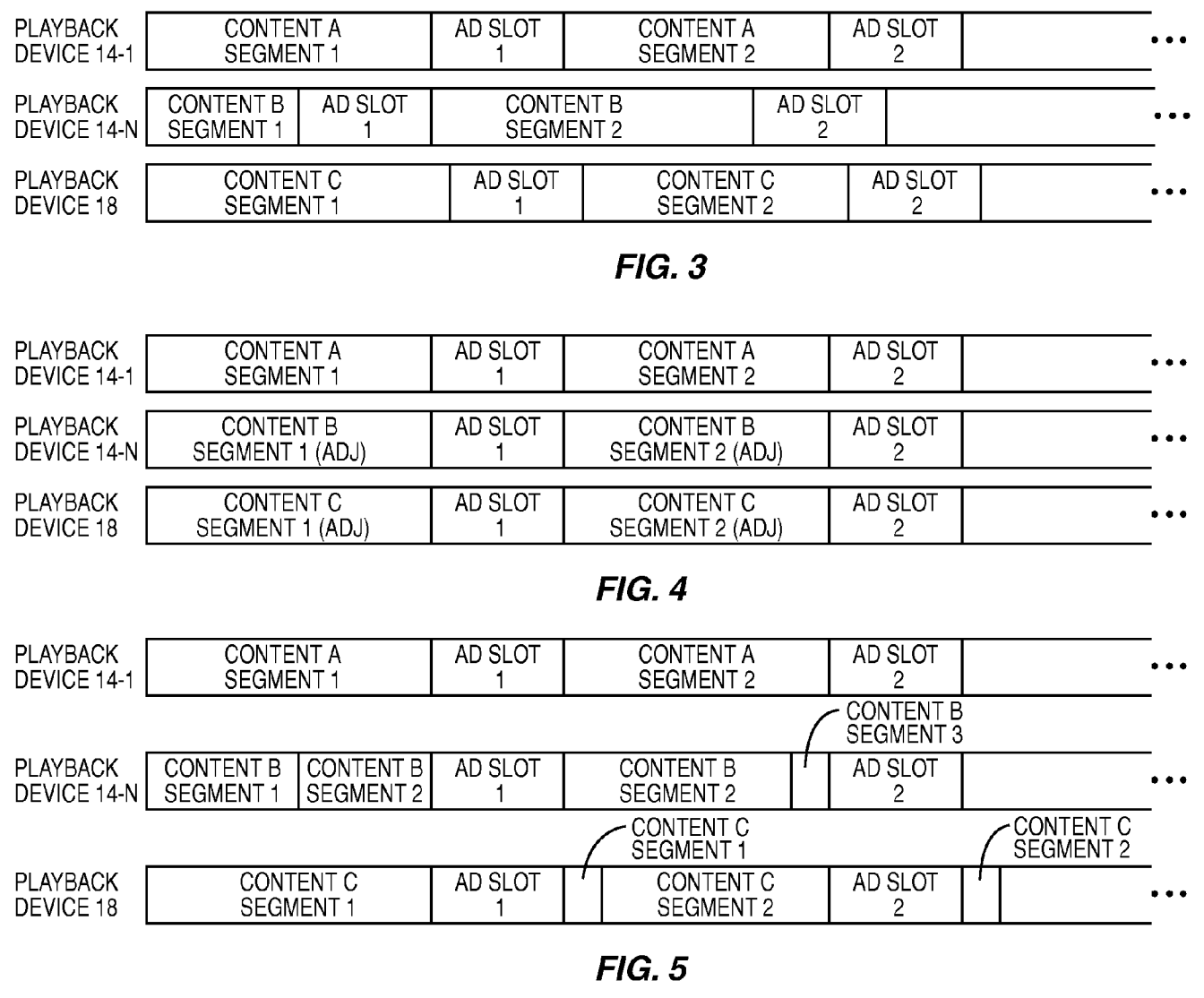

FIG. 3 illustrates natural ad slots or breaks in heterogeneous content played by the playback devices 14-1, 14-N, and 18. FIG. 4 illustrates the same content after coordination of the ad slots by adjusting the timing of the playback of the heterogeneous content at the playback devices 14-1, 14-N, and 18 according to one embodiment of the present invention. More specifically, in this embodiment, the VG control function 24 has synchronized the ad slots at the playback devices 14-N and 18 with the ad slots at the playback device 14-1 by adjusting the playback timing at the playback devices 14-N and 18.

As shown, the playback timing of Segment 1 of the content (Content B) played by the playback device 14-N has been adjusted by slowing down playback of the segment such that a first ad slot (Ad Slot 1), or first natural ad slot, of the content (Content B) is synchronized with the first ad slot (Ad Slot 1) of the content (Content A) played by the playback device 14-1. Likewise, the playback timing of Segment 2 of the content (Content B) is adjusted such that a second ad slot (Ad Slot 2) of the content (Content B) is synchronized with the second ad slot (Ad Slot 2) of the content (Content A) played by the playback device 14-1. The process continues such that each ad slot in the content (Content B) played by the playback device 14-N is synchronized with a corresponding ad slot of the content (Content A) played by the playback device 14-1. Likewise, the ad slots in the content (Content C) played by the playback device 18 are synchronized with the ad slots in the content (Content A) played by the playback device 14-1.

FIG. 5 illustrates the content of FIG. 3 after coordination of the ad slots by inserting artificial ad slots into the content to replace the natural ad slots according to one embodiment of the present invention. More specifically, in this embodiment, the VG control function 24 has synchronized the ad slots at the playback devices 14-N and 18 with the ad slots at the playback device 14-1 by inserting artificial ad slots that are synchronized with the ad slots at the playback device 14-1 and removing, ignoring, or skipping over the natural ad slots of the content played by the playback devices 14-N and 18.

It should be noted that the numbering of the segments and ad slots in FIGS. 3-5 and subsequent figures should not be construed as implying that the beginning of the content at each of the playback devices 14-1 through 14-N and 18 is synchronized. While this may be true, the present invention is not limited thereto. For example, Segment 1 of Content A may be the beginning of that content, Segment 1 of Content B may be a segment near the end of that content, and Segment 1 of Content C may be some segment near the middle of playback of that content.

Figures 6, 7:
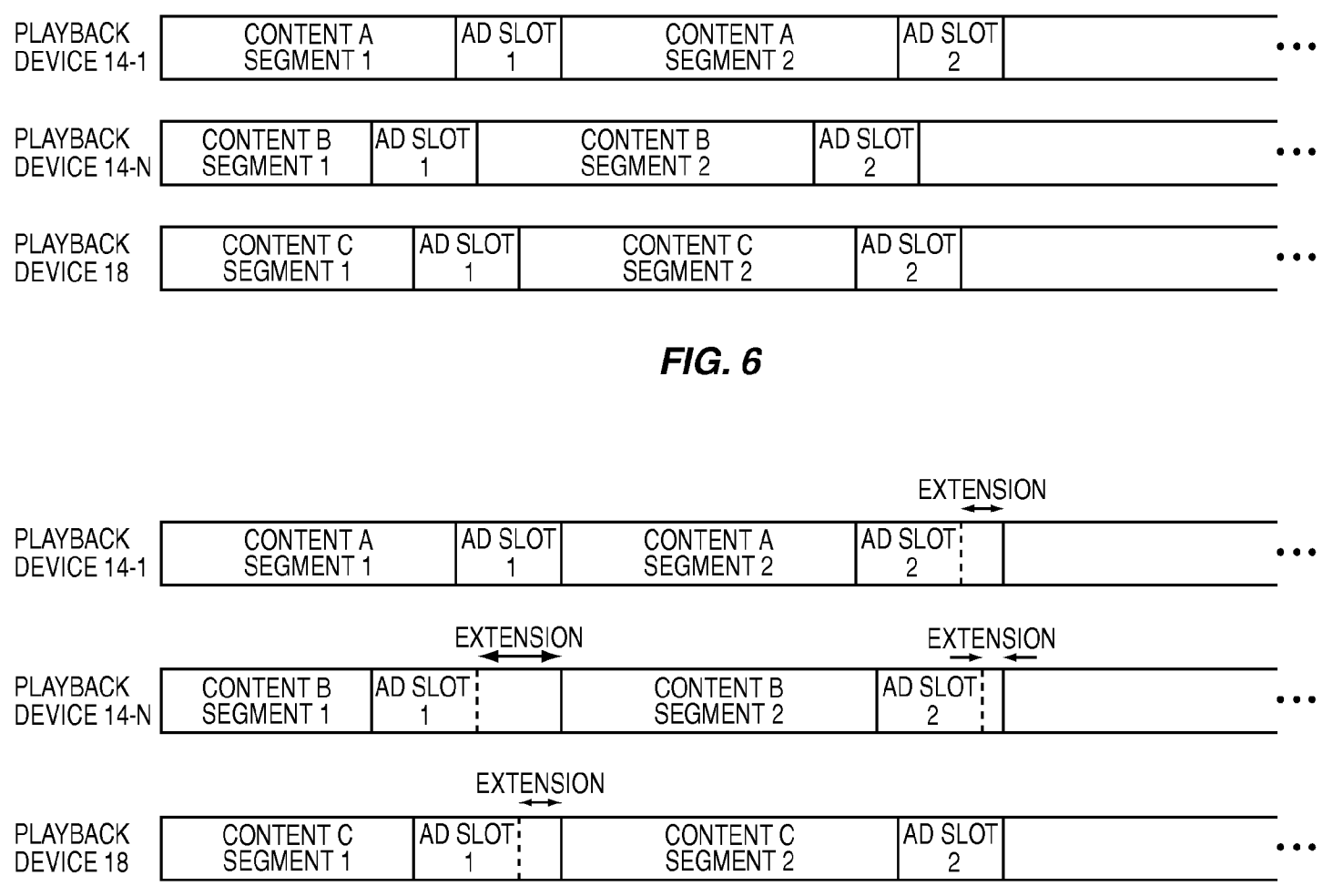

FIGS. 6 and 7 illustrate coordination of ad slots by extending the natural ad slots according to one embodiment of the present invention. FIG. 6 illustrates the natural ad slots in heterogeneous content played by the playback devices 14-1, 14-N, and 18. FIG. 7 illustrates the same content after coordination of the ad slots by extending the natural ad slots according to one embodiment of the present invention. More specifically, in this embodiment, the VG control function 24 has synchronized the ad slots at the playback devices 14-N and 18 with the ad slots at the playback device 14-1 by adjusting the duration or length of the natural ad slots in the content played by the playback devices 14-N and 18. By extending the natural ad slots and adjusting the position of the advertisements in the extended ad slots, the advertisements are synchronized at the playback devices 14-1, 14-N, and 18. A message such as "Please Wait" may be presented during unused portions of the extended ad slots. Alternatively, the playback timing of the advertisements inserted into the extended ad slots may be adjusted such that the advertisements fill the extended ad slots.

Figures 8, 9:
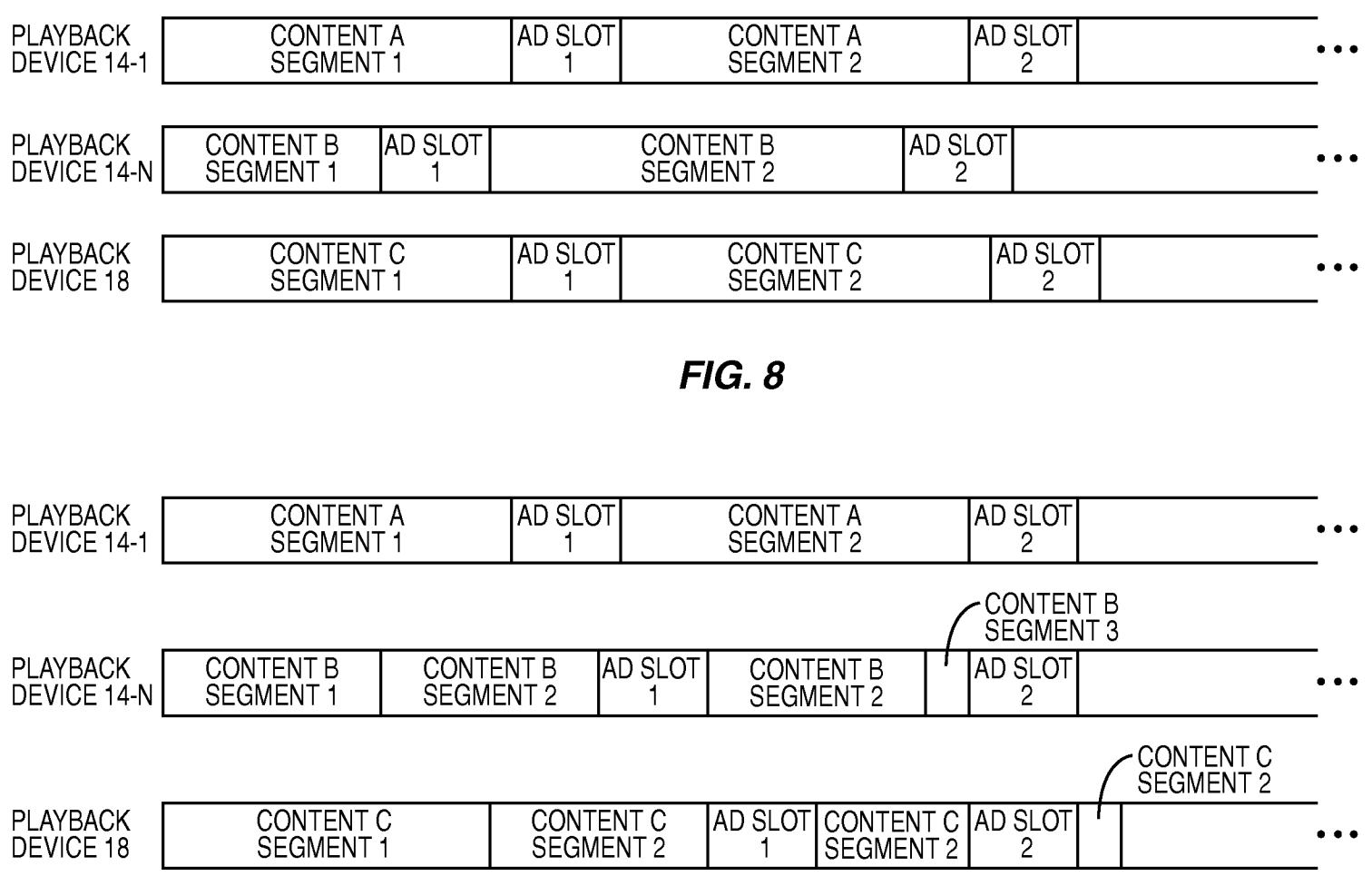

FIGS. 8 and 9 illustrate coordinated ad slots that have been staggered rather than synchronized according to one embodiment of the present invention. FIG. 8 illustrates the natural ad slots in heterogeneous content played by the playback devices 14-1, 14-N, and 18. FIG. 9 illustrates the same content after coordination of the ad slots by inserting artificial ad slots into the content to replace the natural ad slots according to one embodiment of the present invention in a manner similar to that shown in FIG. 5. However, in this embodiment, the coordinated ad slots are staggered rather than synchronized. Note that while the insertion of ad slots is used for this example, the present invention is not limited thereto. The staggered ad slots may alternatively be provided by adjusting playback timing or extending the natural ad slots in a manner similar to that described above.

Figures 10, 11:
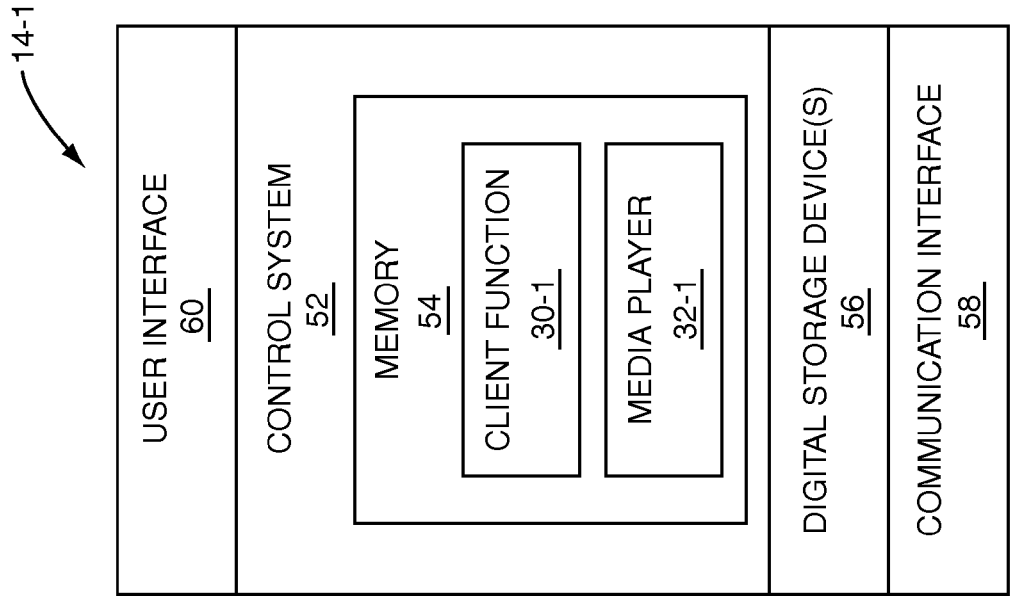
FIG. 10 is a block diagram of the central node of FIG. 1 according to one embodiment of the present invention.
FIG. 11 is a block diagram of one of the playback devices of FIG. 1 according to one embodiment of the present invention.

FIG. 10 is a block diagram of an exemplary embodiment of the central node 12 of FIG. 1. In general, the central node 12 includes a control system 42 having associated memory 44. In this embodiment, the VG control function 24 is implemented in software and stored in the memory 44. However, the present invention is not limited thereto. The VG control function 24 may be implemented in software, hardware, or a combination thereof. The central node 12 may also include one or more digital storage devices 46, one or more communication interfaces 48 communicatively coupling the central node 12 to the playback devices 14-1 through 14-N and 18 and the remote ad server 22, and a user interface 50, which may include components such as one or more user input devices, a display, and the like.

FIG. 11 is a block diagram of an exemplary embodiment of the playback device 14-1 of FIG. 1. Note that this discussion is equally applicable to the other playback devices 14-2 through 14-N and 18. In general, the playback device 14-1 includes a control system 52 having associated memory 54. In this embodiment, the client function 30-1 and the media player 32-1 are implemented in software and stored in the memory 54. However, the present invention is not limited thereto. Each of the client function 30-1 and the media player 32-1 may be implemented in software, hardware, or a combination thereof. The playback device 14-1 may also include one or more digital storage devices 56 operating to store the media content 34-1, a communication interface 58 communicatively coupling the playback device 14-1 to the VG control function 24 at the central node 12, and a user interface 60, which may include components such as one or more user input devices, a display, one or more speakers, and the like.

Those skilled in the art will recognize improvements and modifications to the preferred embodiments of the present invention. All such improvements and modifications are considered within the scope of the concepts disclosed herein and the claims that follow.

What is claimed is:

1. A central node for coordinating advertisements in heterogeneous content played by a plurality of playback devices comprising:
    a digital storage device;
    a communication interface associated with the digital storage device; and
    a control system associated with the digital storage device and configured to:
        receive from the plurality of playback devices schedule information identifying different content played by the plurality of playback devices; and
        coordinate ad slots in the different content played by the plurality of playback devices based on the schedule information to concurrently coordinate the ad slots in the different content, wherein at least one targeted advertisement is provided to the plurality of playback devices for insertion into the coordinated ad slots.

2. The central node of claim 1 wherein the control system is further configured to:
    adjust a timing of playback at one or more of the plurality of playback devices such that the ad slots in the different content played by the plurality of playback devices are coordinated.

3. The central node of claim 1 wherein the control system is further configured to:
    insert artificial ad slots into content played by at least one of the plurality of playback devices such that the artificial ad slots are coordinated with the ad slots in the different content played by the others of the plurality of playback devices, wherein the artificial ad slots are separate from the ad slots.

4. The central node of claim 1 wherein the control system is further configured to:
    extend an ad slot in content played by at least one of the plurality of playback devices such that the ad slots in the different content played by the plurality of playback devices are coordinated.

5. The central node of claim 1 wherein the control system is further configured to:
    synchronize the ad slots in the different content played by the plurality of playback devices.

6. The central node of claim 1 wherein the control system is further configured to:
    stagger the ad slots in the different content played by the plurality of playback devices.

7. The central node of claim 1 wherein the control system is further configured to:
    identify a time at which an ad slot in content played by a first one of the plurality of playback devices is to occur; and
    coordinate the ad slots in the different content played by the others of the plurality of playback devices with the ad slot in the content played by the first one of the plurality of playback devices.

8. The central node of claim 1 wherein the control system is further configured to:
    identify a user of a first one of the plurality of playback devices as a super user; and coordinate the ad slots in the different content played by the others of the plurality of playback devices with an ad slot in content played by the first one of the playback devices.

9. The central node of claim 1 wherein the control system is further configured to:
   identify one of the plurality of playback devices as a playback device playing real-time programming; and
   coordinate the ad slots in the different content played by the others of the plurality of playback devices with an ad slot in content played by the one of the playback devices playing real-time programming.

10. The central node of claim 1 wherein the control system is further configured to:
    enable users of the plurality of playback devices to vote on when an ad slot is to occur; and
    coordinate the ad slots in the different content played by the others of the plurality of playback devices based on the votes of the users of the plurality of playback devices.

11. The central node of claim 1 wherein the control system is further configured to:
    coordinate the ad slots in the different content played by the plurality of playback devices such that the coordinated ad slots are optimized for the at least one targeted advertisement.

12. The central node of claim 1 wherein the control system is further configured to:
    identify a targeted advertisement for each of the plurality of playback devices; and
    effect transfer of the targeted advertisements to the plurality of playback devices, wherein the targeted advertisements are inserted into the coordinated ad slots in the different content played by the plurality of playback devices.

13. The central node of claim 1 wherein the control system is further configured to:
    identify a targeted advertisement for each of a number of sub-groups of the plurality of playback devices; and
    for each one of the number of sub-groups, effect transfer of the targeted advertisement to ones of the plurality of playback devices in the one of the number of sub-groups;
    wherein the targeted advertisements are inserted into the coordinated ad slots in the different content played by the plurality of playback devices.

14. The central node of claim 1 wherein the control system is further configured to: identify a complementary targeted advertisement to the plurality of playback devices; and
    effect transfer of the complementary targeted advertisements to the plurality of playback devices, wherein the complementary targeted advertisements are inserted into the coordinated ad slots in the different content played by the plurality of playback devices.

15. The central node of claim 1 wherein the control system is further configured to:
    identify a group of the plurality of playback devices having related users;
    identify a complementary targeted advertisement for the related users; and
    effect transfer of the complementary targeted advertisements to the group of the plurality of playback devices, wherein the complementary targeted advertisements are inserted into the coordinated ad slots in the different content played by the group of the plurality of playback devices.

16. The central node of claim 1 wherein the control system is further configured to:
    provide a request to a remote ad server, wherein the remote ad server selects the at least one targeted advertisement for the plurality of playback devices in response to the request; and
    effect transfer of the at least one targeted advertisement to the plurality of playback devices, wherein the at least one targeted advertisement is inserted into the coordinated ad slots in the different content played by the plurality of playback devices.

17. The central node of claim 16 wherein the request comprises information selected from a group consisting of information describing the different content played by the plurality of playback devices, information resulting from an analysis of the information describing the different content played by the plurality of playback devices, user preferences of users associated with the plurality of playback devices, information resulting from an analysis of the user preferences of the users associated with the plurality of playback devices, user profiles of the users associated with the plurality of playback devices, and information resulting from an analysis of the user profiles of the users associated with the plurality of playback devices, and the remote ad server is adapted to select the at least one targeted advertisement from a plurality of advertisements based on a comparison of the information in the request and information describing at least one of the plurality of advertisements.

18. The central node of claim 16 wherein the control system is further configured to:
    receive the at least one targeted advertisement from the remote ad server; and
    transfer the at least one targeted advertisement to the plurality of playback devices.

19. The central node of claim 16 wherein the control system is further configured to:
    effect transfer of the at least one targeted advertisement from the remote ad server directly to the plurality of playback devices.

20. The central node of claim 1 wherein the control system is further configured to:
    select the at least one targeted advertisement for the plurality of playback devices; and
    effect transfer of the at least one targeted advertisement to the plurality of playback devices, wherein the at least one targeted advertisement is inserted into the coordinated ad slots in the different content played by the plurality of playback devices.

21. The central node of claim 20 wherein the control system is further configured to:
    select the at least one targeted advertisement based on a comparison of information selected from a group consisting of: information describing the different content played by the plurality of playback devices, user preferences of users associated with the plurality of playback devices, and user profiles of the users associated with the plurality of playback devices and information describing at least one of a plurality of available advertisements.

22. The central node of claim 20 wherein the control system is further configured to:
    provide a request for the at least one targeted advertisement to a remote ad server;
    receive the at least one targeted advertisement from the remote ad server; and
    transfer the at least one targeted advertisement to the plurality of playback devices.

23. The central node of claim 20 wherein the control system is further configured to:

provide a request for the at least one targeted advertisement to a remote ad server, wherein, in response, the remote advertisement server transfers the at least one targeted advertisement directly to the plurality of playback devices.

24. The central node of claim 1 wherein, for each one of the plurality of playback devices, the schedule information comprises information selected from a group consisting of: information describing content played by the one of the plurality of playback devices, a length or duration of the content played by the one of the plurality of playback devices, information defining at least one ad slot in the content played by the one of the plurality of playback devices, information describing at least one segment of the content played by the one of the plurality of playback devices, timing information identifying a current position in playback of the content played by the one of the plurality of playback devices, and playback events.

25. The central node of claim 1 wherein the schedule information comprises information identifying the different content played by the plurality of playback devices and the control system is further configured to:
for each one of the plurality of playback devices, obtain information selected from a group consisting of: information describing content played by the one of the plurality of playback devices, a length or duration of the content played by the one of the plurality of playback devices, information defining at least one ad slot in the content played by the one of the plurality of playback devices, and information describing at least one segment of the content played by the one of the plurality of playback devices from a remote source based on the information identifying the content.

26. The central node of claim 1 wherein the plurality playback devices are associated to form a virtual group of playback devices.

27. The central node of claim 26 wherein users of the plurality of playback devices have a shared experience resulting from at least one of a group consisting of: close physical proximity and interactions via a communications channel.

28. A system for coordinating advertisements in heterogeneous content played by a plurality of playback devices comprising:
at least one communication interface communicatively coupling the system to the plurality of playback devices; and
a control system associated with the at least one communication interface and adapted to:
receive from the plurality of playback devices schedule information identifying different content played by the plurality of playback devices; and
interact with the plurality of playback devices to coordinate ad slots in the different content played by the plurality of playback devices based on the schedule information to concurrently coordinate the ad slots in the different content, wherein at least one targeted advertisement is provided to the plurality of playback devices for insertion into the coordinated ad slots.

* * * * *